United States Patent

[11] 3,567,053

| [72] | Inventor | Harry E. Willock<br>19851 Sharp Road, R. R. #2, Langley,<br>British Columbia, Canada |
|---|---|---|
| [21] | Appl. No. | 813,637 |
| [22] | Filed | Apr. 4, 1969 |
| [45] | Patented | Mar. 2, 1971 |

[54] LOAD HOISTING TRUCK
5 Claims, 5 Drawing Figs.

[52] U.S. Cl. .................................................. 214/652,
214/654, 214/673
[51] Int. Cl. ...................................................... B66f 9/18
[50] Field of Search ........................................... 214/652,
654, 655, 149, 147, 672, 673; 214/674

[56] References Cited
UNITED STATES PATENTS

| 2,807,382 | 9/1957 | Schenkelberger............ | 214/652 |
| 2,867,341 | 1/1959 | Tieslau......................... | 214/672 |
| 3,441,158 | 4/1969 | Wilson ......................... | 214/672 |

FOREIGN PATENTS

| 643,604 | 6/1962 | Canada ......................... | 214/652 |
| 944,358 | 6/1956 | Germany...................... | 214/652 |

*Primary Examiner*—Robert G. Sheridan
*Assistant Examiner*—George F. Abraham
*Attorney*—Fetherstonhaugh and Co.

ABSTRACT: A vehicle for lifting an elongated load extending across the front of the vehicle, moving the load rearwardly above the vehicle to a position where it is approximately vertically aligned with the center of gravity of the vehicle, and finally rotating the load about a vertical axis so that it extends longitudinally of the vehicle.

PATENTED MAR 2 1971 3,567,053

INVENTOR
HARRY E. WILLOCK
BY
Fetherstonhaugh & Co.
ATTORNEYS

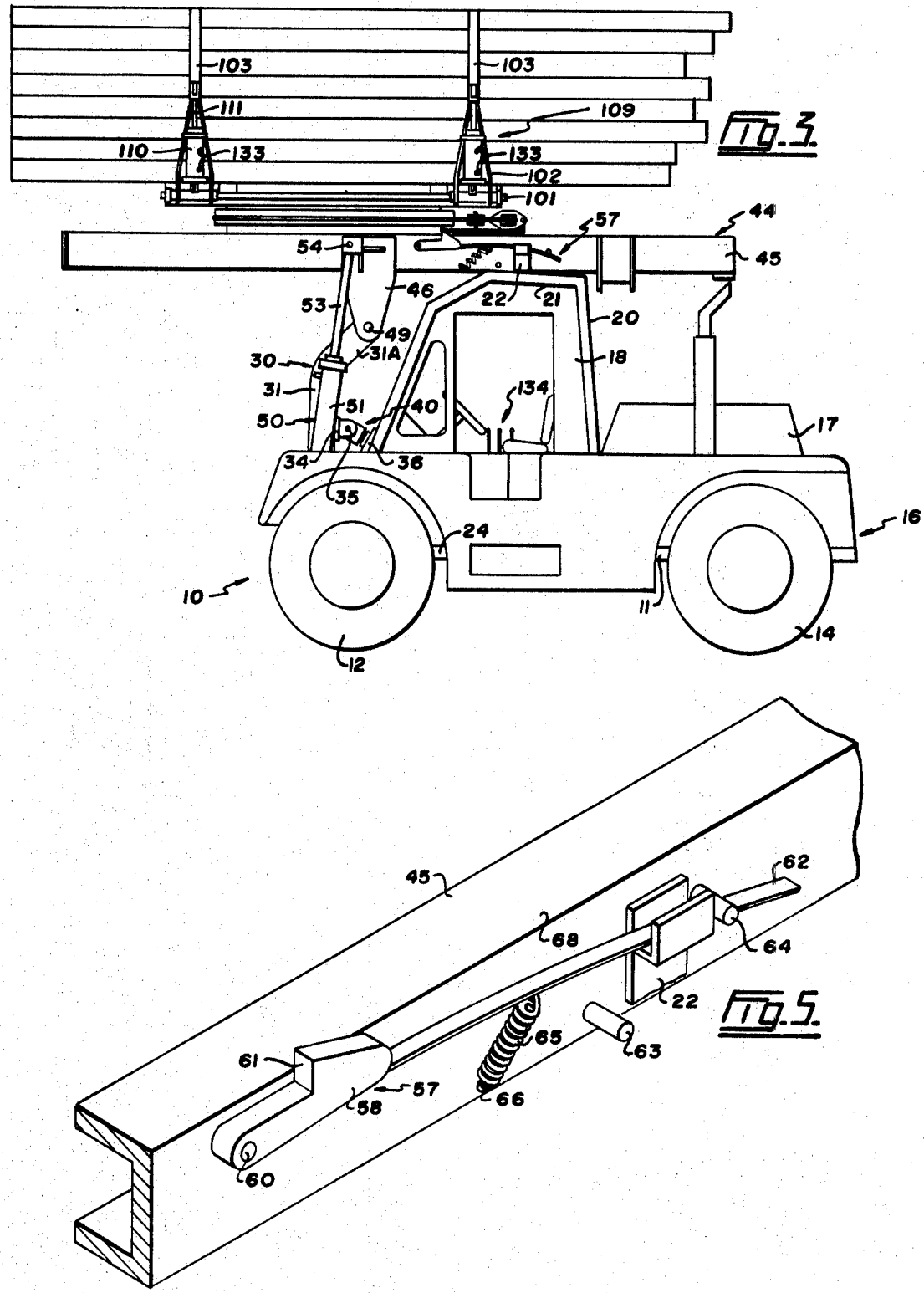

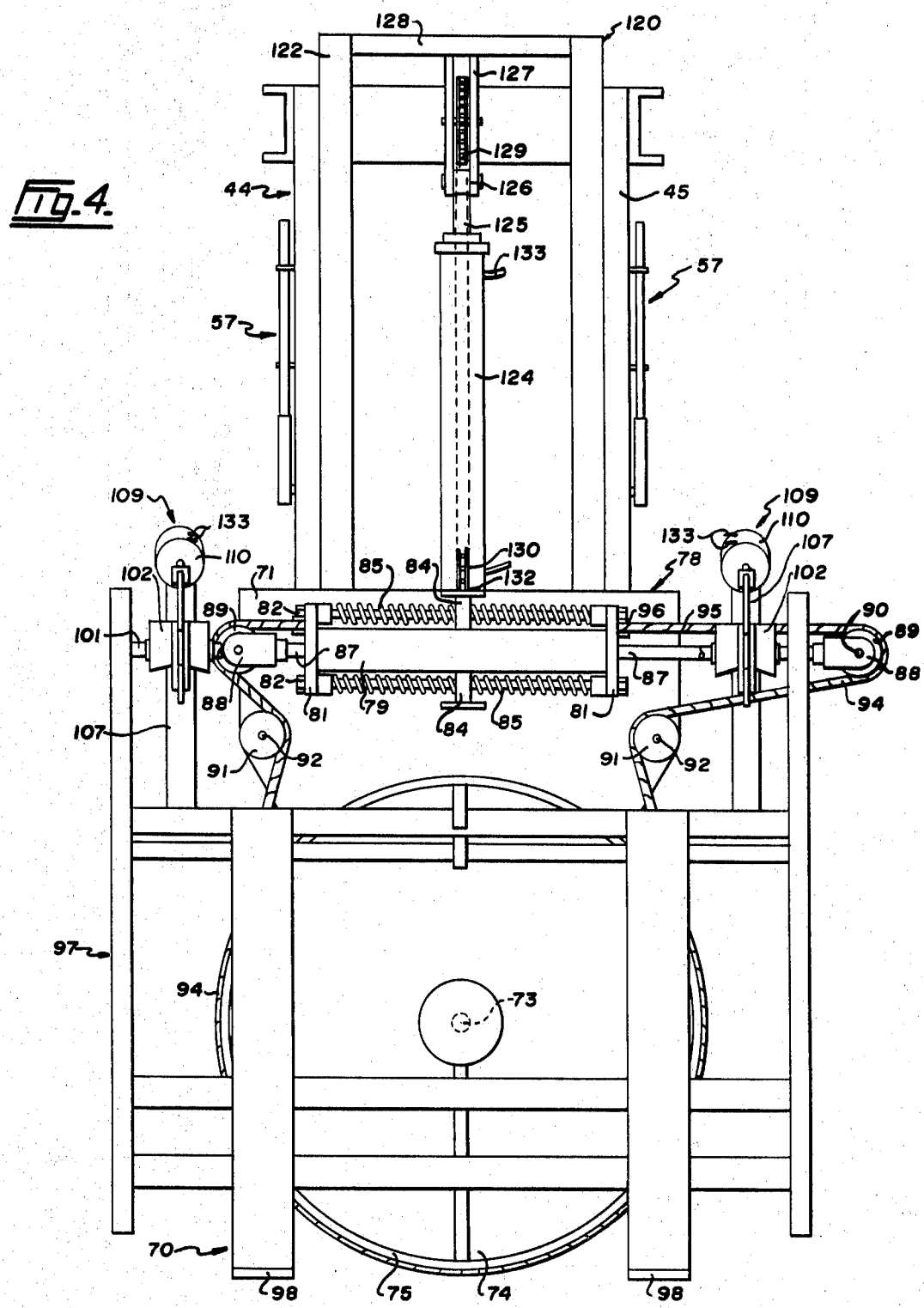

3,567,053

LOAD HOISTING TRUCK

BACKGROUND OF THE INVENTION

My invention relates to improvements in a load transporting vehicle of the forklift variety and more particularly to a truck intended for use in transporting piles of lumber about a storage yard or the like.

A conventional forklift truck has a number of disadvantages which makes it an awkward vehicle to use in a lumber yard or warehouse where space is at a premium and the piles of lumber generally are stacked in closely spaced rows. The corridors between the rows of lumber often leave little room for any vehicle to maneuver and, as a result, a forklift truck sometimes is confined to the task of merely piling and unpiling the stacks of lumber. This means that another vehicle such as a conventional lumber carrier is required to deliver lumber to the truck and to take the lumber away from the truck for delivery elsewhere.

If space permits, a forklift truck can transport lumber to and from the storage area but other problems then present themselves. The forks of the carrier are inserted beneath the lumber pile from the side and, of course, at or very near the center of gravity of the lumber pile. The load then extends a considerable distance on either side of the truck and this restricts the vehicle to travel through corridors slightly wider than the length of the load. If the load is raised only a short distance so as to keep the weight as low as possible, as most drivers prefer to do, vision forward is restricted and the driver has difficulty in avoiding the many obstructions likely to be encountered. The load, of course, can be raised above the driver's line of vision but this overbalances the truck to an undesirable extent. In addition, when the load is carried at one end of the truck, i.e. over the driving wheels of the vehicle as is desirable and usually the case, the driving wheels are overloaded while the steering wheels at the opposite end of the truck are insufficiently loaded for steering purposes.

Attempts have been made to provide vehicles capable of raising an elongated load and turning it horizontally above the truck but such trucks are required to travel with the load supported on the truck bed at approximately the same height as the cab. The driver then has limited vision either forward or to one side and neither condition is satisfactory. Because of these and other factors, including uneven load distribution and tire overload, these earlier attempts to find a solution to the problem of moving lumber or other long loads about in confined spaces have not proved successful.

SUMMARY OF THE INVENTION

I have overcome the above as well as other disadvantages of known and related trucks by providing a load hoisting vehicle which is capable of raising a load above the driver's line of vision and then moving it longitudinally of the vehicle to a balanced position which will provide the best possible traction. When the load subsequently is rotated through about 90°, the driver has an unobstructed view in all directions and is free to maneuver through spaces which need not be much greater than is required for the truck to pass when unloaded. My truck has a number of safety features which safeguard the vehicle from damage which could otherwise occur when a heavy load was being elevated, shifted and rotated to the selected position. The equipment is easily operated by one man who is not required to leave his cab at any time in order to secure the load or to make a check to ensure safety.

BRIEF DESCRIPTION OF THE DRAWINGS

FIG. 3 is a side elevation showing the elongated load rotated to extend longitudinally of the truck;

FIG. 4 is an enlarged front elevation, with truck parts omitted, and showing details of the turntable and hoist tower; and FIG. 5 is a detail perspective view of the cushioning means interposed between the elevated platform and the hoist frame.

DESCRIPTION OF THE PREFERRED EMBODIMENT

Figure 1:
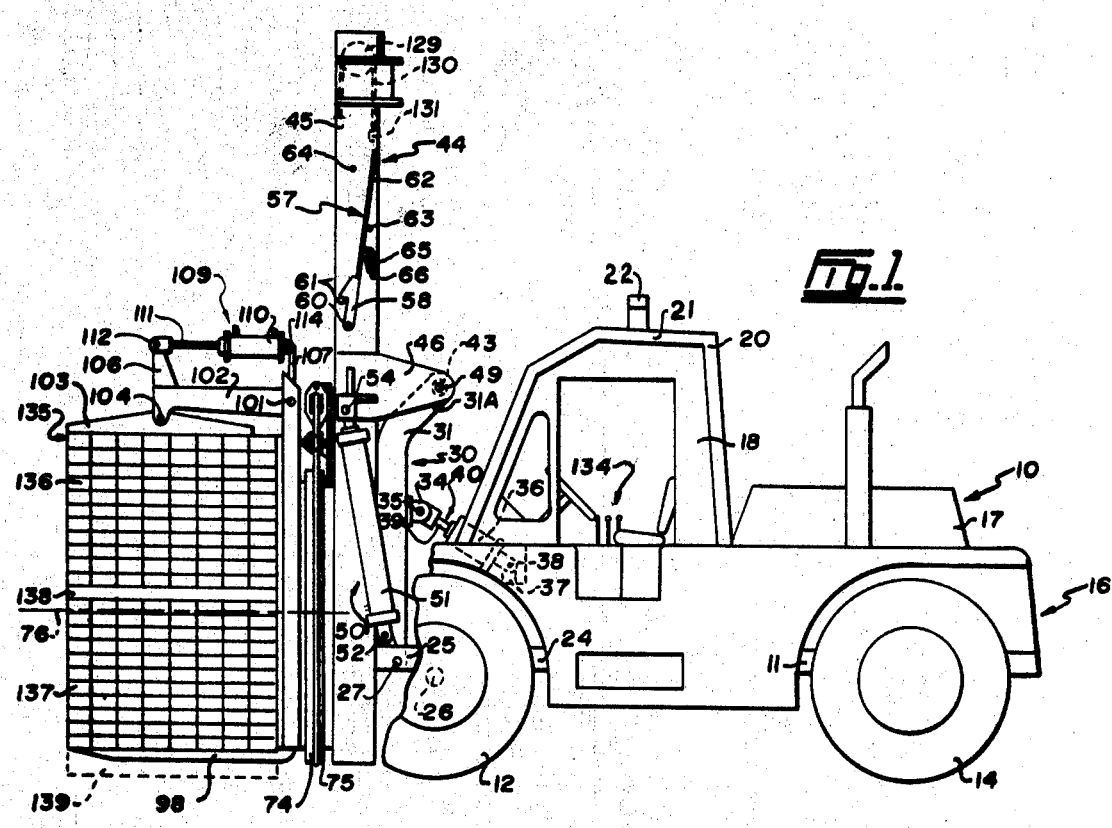
FIG. 1 is a side elevation of the load hoisting truck in accordance with the present invention and showing a ground supported load clamped between the opposing forks.
Figure 2:
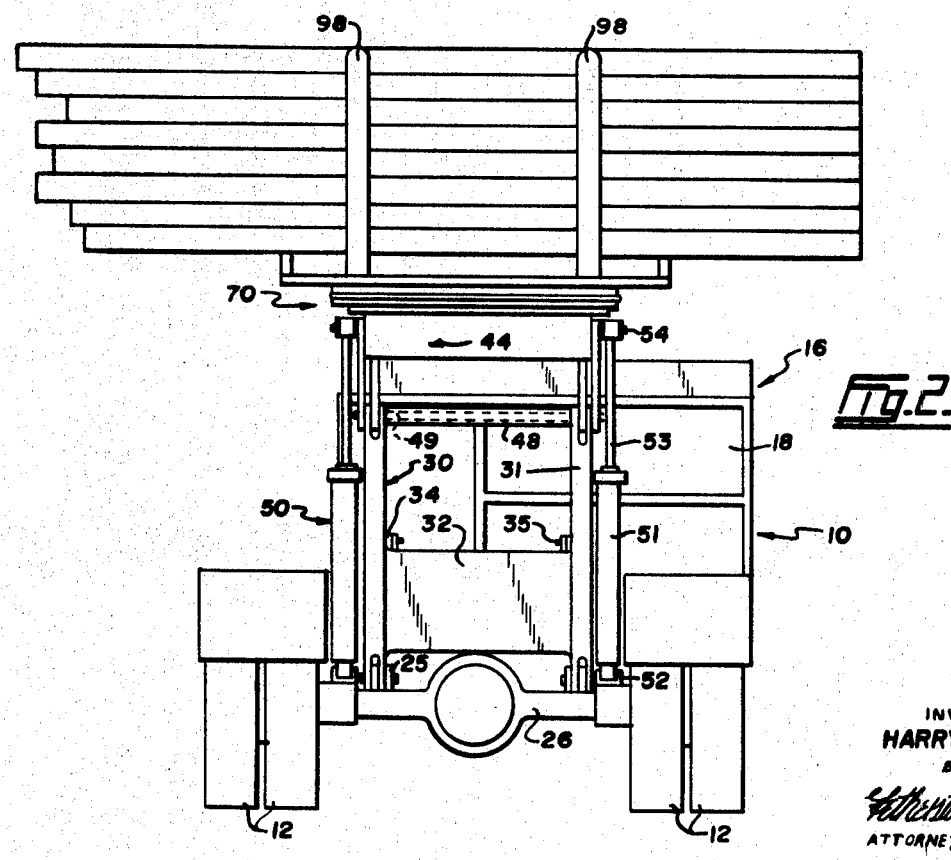
FIG. 2 is a front elevation showing the hoist frame in horizontal position and supporting the transversely extending load above the truck.

Referring first to FIGS. 1, 2 and 3 of the drawings, the numeral 10 indicates generally a truck of a type which has been found suitable for use in transporting lumber and other cargo about a lumber yard or warehouse. This particular truck has a chassis 11 which is mounted on front driving wheels 12 and rear steering wheels 14. Body 16 of the truck 10 is surmounted by a motor housing 17 and a cab 18 for the vehicle operator.

I provide the truck 10 with a stout framework 20 which extends over the cab 18 and between the sides of the body 16. This framework includes an elevated platform 21 which is provided with a pair of transversely spaced posts 22.

Chassis 11 includes longitudinal side members 24 and the front ends 25 of these members project forwardly of the front, driving axle 26, the forwardly projecting ends 25 of said side members being fitted with horizontal pivot pins 27. Mounted on the transversely aligned pins 27, for tilting movement about an axis extending across the chassis 11, is an upright base frame 30 which is substantially H-shaped and has transversely spaced side members 31 and a crossmember 32. Above member 32, the side members 31 are fitted with a centrally disposed and rearwardly projecting pairs of lugs 34, the lugs supporting transverse pivot pins 35. Short, double-acting hydraulic cylinders 36 are secured to parts 37 of the truck body 16 by pivot pins 38 and the piston rods 39 of said cylinders are connected to the pivot pins 35. Thus, the cylinders 36 and associated parts provide means generally indicated at 40, for tilting the upright base frame 30 rearwardly and forwardly a few degrees about the pivot pins 27 and also for rigidly supporting said base frame in the vertical position shown in FIG. 1.

The numeral 44 indicates generally a rectangular hoist frame having side members 45 which are fitted, at about midlength, with rearwardly projecting cranks 46. The side members 31 of the base frame have rearwardly inclined upper ends 31A and these ends are cross connected by a horizontal sleeve 48. Sleeve 48 serving as a bearing for a pivot shaft 49 and the cranks 46 are suitably connected to the ends of said pivot shaft. By pivotally connecting the hoist frame 44 to the upper end of the base frame 30 in this manner, said hoist frame is mounted for rocking movement about the horizontal axis of the pivot shaft 49 which extends transversely of the chassis 11.

Means generally indicated at 50 is provided for rocking the hoist frame 44 about the axis of the transverse shaft 49. As shown in FIGS. 1, 2 and 3 of the drawings, means 50 comprises two hydraulic cylinders 51 with one of the cylinders being positioned alongside each side member of the hoist frame 45. The double-acting cylinders 51 are secured to the ends 25 of the chassis side members by pivot pins 52 and the piston rods 53 of these cylinders are secured to the cranks 46 by pivot pins 54. When the upper ends of the cylinders 51 are pressurized, hoist frame 44 is held in a substantially vertical position parallel to the base frame 30, see FIG. 1. By pressurizing the lower ends of the cylinders 51, the hoist frame 44 can be swung to a substantially horizontal position overlying the chassis 11 and partly supported by the elevated platform 21 with the side members 45 disposed between the posts 22 on the framework 20, see FIGS. 2 and 3.

In order to reduce the shock which might occur as the hoist frame 44 is rocked to the horizontal position and is lowered on to the platform 21, cushioning means 57 is interposed between said platform and said hoist frame. As illustrated in FIGS. 1, 3 and 5, means 57 comprises a pair of arms 58, there being one such arm fitted to each side member 45. Laterally projecting hinge pins 60 are secured to the members 45 and these pins extend through one end of the arms 58, and the opposite or free ends of the arms 58 are provided with hooks 61. Leaf springs 62 extend away from the hooked ends of the arms 58 and between spaced stops 63 and 64 carried by the side members 45. Small coil springs 65 connect the leaf springs 62 to lugs 66 projecting from the side members 45 so as normally to swing the arms 58 about the pins 60 and hold the leaf springs in contact with the stops 63. As the hoist frame 44 is lowered between the posts 22, these posts engage the leaf spring 62 and swing them into engagement with the stops 64. Continued movement of the frame 44 downwardly between the posts 22 results in the leaf springs 62 being flexed so as to cushion the hoist frame as it is brought to a halt in a horizontal position. When the springs 62 are fully flexed, the arms 58 are swung about the hinge pins 60 to dispose the hooks 61 so that they project above the face 68 of the side members 45 and for reasons which will be made apparent later.

Truck 10 is provided with a hoist assembly generally indicated at 70, this assembly including a carriage 71 which is suitably mounted on the hoist frame 44 for sliding movement along the face 68 thereof. Rotatably mounted on the carriage 71, by means of a spindle 73 (FIG. 4 only), is a turntable 74 having a peripheral flange 75. Turntable 74 is adapted to rotate about the axis of the spindle 73, which axis is indicated by the line 76 in FIG. 1. It will be noted that the axis of rotation 76 is disposed at right angles to the transverse shaft 49 and that it is centrally located with respect to the vehicle chassis 11.

Referring again to FIG. 4, the turntable 74 is adapted to be rotated by means generally indicated at 78 and preferably comprising a hydraulic cylinder 79, this double-acting cylinder being fitted at opposite ends with plates 81. Rods 82 are secured to the end plates 81 to extend parallel to the cylinder 79. Lug bearings 84 project from the front face of the carriage 71 and the rods 82 slidably extend through these bearings. Shock-absorbing springs 85 are mounted on the rods 82 between the end plates 81 and the lug bearings 84 so as to resist endwise movement of the cylinder 79 on the carriage.

Cylinder 79 has a piston rod 87 which slidably projects through both end plates 81, the projecting ends of this rod being fitted with forks 88. Pulleys 89 are mounted within the forks 88 on the axle pins 90. Other pulleys 91 are journaled on spindles 92 which project from the front face of the carriage 71. A length of cable 94 is trained over the flange 75 of the turntable as well as over the pulleys 91 and 89, the cable ends 95 being secured as at 96 to the end plates 81. Thus, as shown best in FIG. 4, when the right end of the double-acting cylinder 79 is pressurized, the rod 87 is moved to the left and this movement winds the cable 94 so that the turntable 74 is rotated clockwise through 90°. Obviously, the rod 87 can be moved to the right by applying fluid pressure to the left end of the cylinder 79 to rotate the turntable 74 counterclockwise through 90° and return it to the original position. At the end of each rotational movement, the shock incidental to bringing to a halt the heavy turntable 74 and parts mounted thereon is absorbed by the spring means 85.

The turntable 74 carries a fork frame 97 which is fitted with a pair of lower forks 98. These fixed and parallel forks 98 are widely spaced apart transversely of the frame 97 and project forwardly thereof. As shown in FIGS. 1 and 3 as well as in FIG. 4, the upper part of the frame 97 is provided with a transversely extending shaft 101 and swingingly mounted on this horizontal shaft is a pair of transversely spaced arms 102. These forwardly extending arms 102 carry a pair of upper forks 103. Forks 103 are secured to the outer ends of arms 102 by pivot pins 104 so that said forks are free to rock slightly about said pins. Levers 106 are secured to the arms 102 above the pins 104 and, adjoining the shaft 101, the frame 97 has uprights 107 opposing said levers. Thus, the forks 103 can be moved towards and away from the forks 98 and means generally indicated at 109 is provided for operating the forks in this manner.

As shown best in FIGS. 1 and 3, the means 109 comprises a pair of double-acting hydraulic cylinders 110 which are mounted one above each arm 102. Piston rods 111 of the cylinders 110 are connected to the levers 106 by pivot pins 112 and the cylinders themselves are similarly connected to the uprights 107 by pivot pins 114. Thus, the means 109 enables the opposing pairs of forks 98 and 103 to be moved into clamping and supporting engagement with a load. When the outer ends of the cylinders 110 are pressurized, the upper and lower forks are spaced apart a distance slightly greater than the maximum height of any load the truck is required to handle.

Means generally indicated at 120 is provided for moving the hoist assembly 78 endwise of the frame 44 to a selected position thereon. As shown in FIG. 4 of the drawings, means 120 comprises a telescopic auxiliary frame 122 which is slidably mounted between the slide members 45 of the hoist frame so that said auxiliary frame can be extended therefrom. A longitudinally extending hydraulic cylinder 124 is mounted in the center of the hoist frame 44 and this cylinder has a piston rod 125 which is connected as at 126 to the auxiliary frame 122. A bracket 127, depending from the underside of a crossmember 128 on the auxiliary frame, journals a vertically disposed sprocket 129 over which a length of chain 130 is trained. One end of the chain 130 is anchored to a bar 131 extending across the rear face of the frame 44 and the other end of said chain is suitably secured as at 132 to the carriage 71 of the hoist assembly. Thus, when the lower end of the cylinder 124 is pressurized to extend the rod 125, the auxiliary frame 122 is moved out of the hoist frame 44. This movement of the auxiliary frame causes the chain 130 to wind around the sprocket 129 so that the hoist assembly 70 is raised a greater distance along the frame 44 than the auxiliary frame 122 is extended.

The several aforementioned hydraulic cylinders for operating the various parts of the truck 10 are connected by the usual hydraulic circuits, only partly shown and designated by the single numeral 133 to control valves 134 mounted in the cab 18 and readily accessible to the driver. These hydraulic circuits 133 obviously include a pump, not shown, which conveniently can be driven from a power takeoff on the truck engine.

The truck 10 is designed particularly to lift and transport a pile 135 of lumber which is made up of upper and lower sections 136 and 137. These standard sized sections are separated at suitable intervals of their length by transversely extending spacers 138 and normally the lumber pile rests upon bearer blocks 139, see FIG. 1.

To pick up such a pile 135, the truck is driven up to a point beside the lumber with the forks 98 and 103 open to their fullest extent. Cylinder 36 is pressurized to tilt the base frame 30 so that said frame and, of course, all parts mounted thereon are inclined forwardly to a slight extent. The truck is then advanced to place the forks below and above the load whereupon pressurized oil is directed to the cylinders 110 to clamp the lumber between the forks. Cylinder 36 is then pressurized to tilt the base frame 30, and all the parts supported thereby, to a rearwardly inclined position. This places the center of gravity of the load further to the rear of the truck so that the load can be raised more easily than otherwise would be the case. Cylinder 124 is pressurized to raise the load upwardly of the frame 44 and subsequently oil under pressure is fed to the cylinders 51 to rock the hoist frame about the shaft 49 to a horizontal position. Once the frame 44 is in the horizontal position and is partially supported by the platform 21, the then transversely extending load, see FIG. 2, is positioned approximately over the driving wheels 12. At this time, the hooks 61 are projected above the face 68 of the side members 45 so as to be disposed in the path of the carriage 71. The leading edge of the carriage 71 engages the hooks 61 whereupon further rearwardly movement of the hoist assembly 70 and the load of lumber supported thereby is brought to a halt.

At the unloading site, the above movements are repeated in reverse order to place the lumber pile in any selected position. This position may be on top of another lumber pile which will mean that the clamped pile of lumber will need to be raised to the top of the frame 44. Since the hooks 61 are retracted below the face 68 whenever the hoist frame 44 is lifted off the platform 21, the hoist assembly 70 can move freely up and down said tower without obstruction.

From the foregoing, it will be apparent I have provided a truck which is particularly well suited for transporting lumber or other similar material. The boards making up the lumber pile need not be tied together in any way, the pile being clamped tightly by the forks at all times so that the load cannot shift or the boards move relative to one another. The lumber load is hoisted above the truck and is rotated to the desired position for travel in one substantially continuous movement which are effected by the driver operating a few simple controls in the safety of the truck cab. As the load is rotated above the horizontal hoist frame 44 and is showed to a halt at the end of each rotational movement, the springs 85 absorb any shock which might otherwise damage the mechanism if the momentum of the load was too great. The cushioning means 57 take the considerable weight of the frame 44 and associated parts and the load as said frame is lowered on to the platform 21 and this too prevents undue shock and possible damage. Thus it will be seen the present truck is capable of hoisting, shifting, rotating and transporting elongated loads with ease and speed and by one man who has an unobstructed view while driving as well as during each movement of the load on the truck.

I claim:

1. A truck comprising a chassis, an upright base frame mounted on one end of the chassis, a hoist frame pivotally connected intermediate the length thereof to the upper end of the base frame for rocking movement about an axis extending transversely of the chassis, means for rocking the hoist frame between a substantially vertical position parallel to the base frame and a substantially horizontal position above the chassis, a hoist assembly mounted on the hoist frame for movement longitudinally thereof, means for moving the hoist assembly to a selected position on the hoist frame, said hoist assembly including a turntable rotatable about an axis normal to the transverse rocking axis of the hoist frame, opposing forks mounted on the turntable for relative movement towards and away from each other, means for operating the forks to grip and support a load therebetween, and means for rotating the turntable, a framework surmounting the chassis and having an elevated platform, said hoist frame being supported by the elevated platform when in the substantially horizontal position above the chassis, and cushioning means interposed between the elevated platform and the hoist frame, said cushioning means including a normally retracted hook, said hook being projected into the path of the hoist assembly in response to engagement of the hoist frame with the elevated platform.

2. A truck comprising a chassis, an upright base frame mounted on one end of the chassis, a hoist frame pivotally connected intermediate the length thereof to the upper end of the base frame for rocking movement about an axis extending transversely of the chassis, means for rocking the hoist frame between a substantially vertical position parallel to the base frame and a substantially horizontal position above the chassis, a hoist assembly mounted on the hoist frame for movement longitudinally thereof, means for moving the hoist assembly to a selected position on the hoist frame, said hoist assembly including a turntable rotatable about an axis normal to the transverse rocking axis of the hoist frame, opposing forks mounted on the turntable for relative movement towards and away from each other, means for operating the forks to grip and support a load therebetween, and means for rotating the turntable comprising a double-acting fluid cylinder mounted on the hoist assembly, said fluid cylinder having a piston rod projecting from opposite ends thereof, said turntable having a peripheral flange, and a flexible member operatively connecting the projecting ends of the piston rod to the peripheral flange whereby endwise movement of said piston rod in one direction will cause corresponding rotational movement of the turntable.

3. A truck as claimed in claim 2, in which said fluid cylinder is provided with end plates, a connecting rod extending between the end plates parallel to the fluid cylinder, a bearing mounted on the hoist assembly, said connecting rod being slidably mounted in the bearing whereby both said connecting rod and the fluid cylinder have limited endwise movement, and shock-absorbing springs mounted on the connecting rod between the end plates and the bearing.

4. A truck comprising a chassis, a framework supported on the chassis and having an elevation platform, an upright base frame mounted on one end of the chassis, a hoist frame pivotally connected intermediate the length thereof to the upper end of the base frame for rocking movement about an axis extending transversely to the chassis, means for rocking the hoist frame between a substantially vertical position parallel to the base frame and a substantially horizontal position above the chassis and partially supported by the elevated platform, a hoist assembly mounted on the hoist frame for movement longitudinally thereof, means for moving the hoist assembly to a selected position on the hoist frame, said hoist assembly including a carriage and a turntable rotatably mounted on said carriage for rotation about an axis normal to the transverse rocking axis of the hoist frame, a double-acting fluid cylinder mounted on the carriage, said fluid cylinder having a piston rod projecting from opposite ends thereof, said turntable having a peripheral flange, a flexible member operatively connecting the projecting ends of the piston rod to the peripheral flange whereby endwise movement of said piston rod in one direction will cause corresponding rotational movement of the turntable, said turntable having opposing pairs of forks movable towards and away from each other, and means for operating the forks to grip and support a load therebetween, said framework having an upstanding support member, said hoist frame having a swingingly mounted arm, a leaf spring projecting from a free end of the arm, spaced stops on the hoist frame engageable by the leaf spring to limit swinging movement of the arm, said leaf spring being engaged by the upstanding support member when the hoist frame reaches the substantially horizontal position.

5. A truck as claimed in claim 4, in which said arm has a hook on the free end thereof, said hook being swung into the path of the hoist assembly in response to engagement of the leaf spring by the upstanding support member.